UNITED STATES PATENT OFFICE.

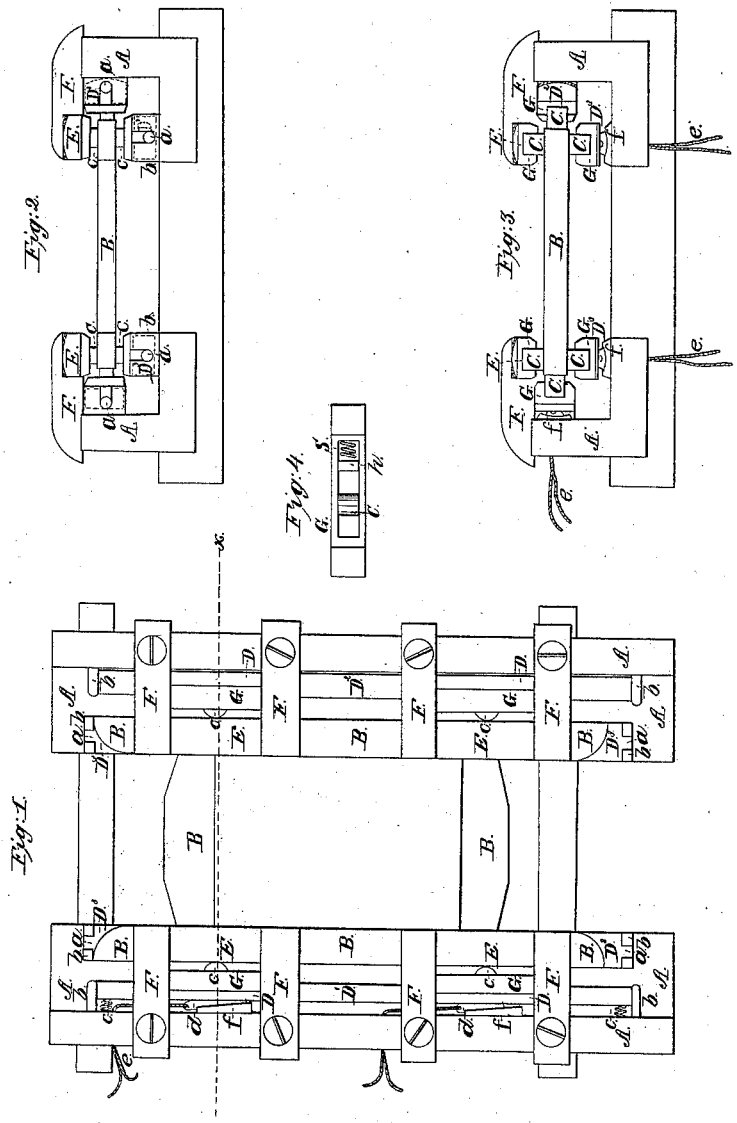

SAMUEL DARLING, 2D, OF GROTON, VERMONT.

MANNER OF ARRANGING THE SAW-GATES AND FENDER-POSTS OF SAWMILLS.

Specification of Letters Patent No. 2,615, dated May 7, 1842.

*To all whom it may concern:*

Be it known that I, SAMUEL DARLING, 2d, of Groton, in the county of Caledonia and State of Vermont, have made certain Improvements in the Manner of Combining and Arranging the Saw-Gates and Fender-Posts of Sawmills; and I do hereby declare that the following is a full and exact description thereof.

My improvement consists in the manner of employing twelve, or more, friction rollers to lessen the friction of the saw gate, and to cause it to vibrate easily and steadily within the fender posts. For this purpose I employ at least six pairs of such rollers, one pair of which acts against each edge of the saw frame, and one pair against each of the faces of its front and back sides; these friction rollers are made without gudgeons, being received into suitable boxes, spaces, or recesses, formed of metal, by which they are kept in place; there being in each of these boxes, spaces, or recesses, at the lower ends thereof, a spiral spring, and a cushion of leather, or other elastic material, against which the rollers may strike in their descent, and by which any tendency to move from their proper position is corrected. And as it would not be possible to keep such friction rollers in their places were they made to bear against fender posts in the usual way, as such fender posts are unyielding, I cause said rollers to act against vertical pieces of timber which I denominate false cheeks, and which are placed within the fender posts, and are made capable of rotating to a certain extent, and which are also regulated by the action of springs, so as to cause them and the friction rollers to bear uniformly against the saw frame.

In the accompanying drawing, Figure 1 is a front view of the saw frame, and fender posts. Fig. 2, is an end view thereof, looking at the fender posts and saw frame from the top, or bottom. Fig. 3, is a cross section, in the line $x$, $x$, of Fig. 1; and Fig. 4, shows one of the boxes which contains a friction roller, and a spiral spring and cushion.

A, A, are the fender posts which are attached to the frame of the mill in the usual way.

B, B, is the saw frame, which does not touch the fender post on either of its sides, but works against friction rollers C, C, C, that are borne up against the frame by the vertical timbers, or false cheeks, D, D, which are made movable, or yielding. These false cheeks have gudgeons, $a$, $a$, at their upper and lower ends, which are received within slots, or openings, in pieces of metal, $b$, $b$, attached to the fender posts; these slots allowing the false cheeks to rock, and also to move toward or to recede from, the saw frame.

Spiral, or other, springs, $c$, $c$, are interposed between the fender post and the false cheek D′, serving to bear it up against the edge of the saw frame, and to force the saw frame against the opposite false cheek D², which latter may bear against the fender post, but is to have its back edge rounded, as shown in Fig. 3, to allow it to rock, and adapt itself to the friction rollers.

The two rear false cheeks D³, D³, are, like D′, borne up against the back of the saw frame by springs, which keep the front of the saw frame against its bearings on the front friction rollers. There may be false cheeks in front of the saw frame, extending up and down like those already described, but the boxes which contain the front rollers may be sustained by short pieces of timber E, E, confined, or held in place, by brackets F, F, screwed to the fender posts. The pieces E, E, I make rounding where they bear against the brackets F, F, so as to allow them to rock in a slight degree.

I do not depend upon the spiral, or other, spring, alone, to keep the false cheeks D′, and D², up to their bearings, but I interpose wedges between them and the fender posts, as shown at $d$, $d;$ which wedges are attached to cords $e$, $e$, that pass over pulleys in the fender posts, and may have counter weights attached to them. By means of these the false cheeks may be borne up with any desired degree of force, so as to have no more play than is necessary for the action of the springs. The face of the wedges $d$, $d$, which act against the bearing pieces $f$, $f$, I make rounding, longitudinally, so that they may rock with the false cheek. The two rear false cheeks, D³, D³, are similarly provided with wedges, arranged and governed in the same manner.

In Fig. 4, the roller $c$, is shown as contained within a recess adapted to it in the box G. In the lower end of this box there is a spiral spring $g$, the upper end of which sustains a cushion, or elastic substance, $h$, against which the roller C, may strike in its descent. The ends of said roller are flat, and they are made to fit accurately against the sides of the recess within which they are contained; by this means, and by the action of the spring and cushion, they are retained in place, and made to operate in the manner required. The part of the frame against which they operate I cover with plates of metal to prevent the bruising and grooving of the wood, and I lubricate such parts as require it with any suitable antifriction material, or compound. In my arrangement, I never use fewer than twelve rollers, but this number may be increased if desired, the whole being made to operate upon the same principle. It will be seen that from the foregoing construction of the respective parts, the rollers will accommodate themselves to any ordinary inequality, shrinkage, or casting of the wood, the bearings being all made yielding, or self-adapting.

Having thus fully described the nature of my improvement in the saw gates and fender posts of saw mills, what I claim therein as new, and desire to secure by Letters Patent is,—

1. The arranging of the respective friction rollers in the boxes, or recesses, within which they are contained, in such manner as that they shall, at every descent, be acted on by springs and cushions in the lower part of said recesses, in the manner, and for the purpose set forth.

2. I claim, also, the manner of arranging and combining the vertical timbers which I have denominated false cheeks, so that they may rock, or vibrate, to the required extent; and so that they, with the friction rollers, shall be kept up to their bearings by means of springs and wedges, operating substantially in the manner herein described.

3. I claim, likewise, the manner in which I have combined twelve, or more, friction rollers, with a saw frame and fender posts, through the intermedium of false cheeks which have a vibrating, or rocking, motion, and which are borne up against the saw frame by the action of springs, the general arrangement and combination of the respective parts of the whole apparatus being the same, or substantially the same, with that herein fully described and made known.

SAML. DARLING, 2D.

Witnesses:
 WM. DARLING,
 AMMON DARLING.